United States Patent
Liu et al.

(10) Patent No.: US 10,512,992 B2
(45) Date of Patent: Dec. 24, 2019

(54) WHEEL BOLT PRESSING DEVICE

(71) Applicant: CITIC Dicastal CO., LTD, Qinhuangdao (CN)

(72) Inventors: Weidong Liu, Qinhuangdao (CN); Shengchao Zhang, Qinhuangdao (CN); Haiping Chang, Qinhuangdao (CN); Yingfeng Wang, Qinhuangdao (CN); Yeling Tian, Qinhuangdao (CN); Dan Yao, Qinhuangdao (CN)

(73) Assignee: CITIC DICASTAL CO., LTD, Qinhuangdao, Hebei (CN)

( * ) Notice: Subject to any disclaimer, the term of this patent is extended or adjusted under 35 U.S.C. 154(b) by 147 days.

(21) Appl. No.: 15/840,787

(22) Filed: Dec. 13, 2017

(65) Prior Publication Data
US 2019/0030664 A1  Jan. 31, 2019

(30) Foreign Application Priority Data
Jul. 31, 2017 (CN) .......................... 2017 1 0635530

(51) Int. Cl.
*B23P 19/027* (2006.01)
*B60B 3/16* (2006.01)

(52) U.S. Cl.
CPC ............... *B23P 19/027* (2013.01); *B60B 3/16* (2013.01); *B60B 2310/228* (2013.01)

(58) Field of Classification Search
CPC .............. C07D 241/08; C07D 207/40; C07D 207/416; C07D 233/74; C07D 213/74; C07D 211/88; C07D 239/22; A61P 35/02; Y10T 29/53448; Y10T 29/49492; Y10T 29/49494; Y10T 29/49496; Y10T 29/49497; Y10T 29/49499; Y10T 29/49501; Y10T 29/49503; Y10T 29/49504; Y10T 29/49506; Y10T 29/49508; Y10T 29/4951; Y10T 29/49512; Y10T 29/49513; Y10T 29/49515; Y10T 29/49517; Y10T 29/49519; Y10T 29/4952; Y10T 29/49522; Y10T 29/49524; Y10T 29/49526; Y10T 29/49528; Y10T 29/49529; Y10T 29/49531; Y10T 29/49533; Y10T 29/49535;
(Continued)

(56) References Cited

U.S. PATENT DOCUMENTS 5,799,543 A * 9/1998 Nagai ..................... B25J 9/023
  74/490.09
2013/0168032 A1* 7/2013 Lawson .................. B25J 11/00
  157/1.17

* cited by examiner

*Primary Examiner* — Sarang Afzali
*Assistant Examiner* — Darrell C Ford
(74) *Attorney, Agent, or Firm* — Calfee, Halter & Griswold LLP

(57) ABSTRACT

The present application discloses a wheel bolt pressing device, which includes a frame, a servo motor, a connecting shaft, a bottom plate, a mounting base, a cylinder, a support, a spring A, a pull pin, a limiting sleeve, a thrust bearing, a bracket, a bolt, a strong magnet, a bolt mounting rack, a large linear bearing, a guide shaft, a press-down cylinder, a cylinder flange, a balancing stand, a guard, rollers, a mounting shaft, a mounting rack, contacts, an elastic rubber band, a holder, pin rolls and the like. The device may meet the requirement of a wheel for pressing bolts on line in use, which has ideal effect, high efficiency, and high automation degree. In addition, the wheel bolt pressing device is safe and reliable in work, and is particularly suitable for batch production in production lines.

2 Claims, 4 Drawing Sheets

(58) Field of Classification Search
CPC ......... Y10T 29/49536; Y10T 29/49538; Y10T 29/4954; Y10T 29/49542
USPC ................................ 29/802, 894.3–894.381
See application file for complete search history.

WHEEL BOLT PRESSING DEVICE

CROSS-REFERENCE TO RELATED APPLICATIONS

This application claims priority to Chinese Patent Application No. 201710635530.7, filed on Jul. 31, 2017, which is hereby incorporated by reference in its entirety.

TECHNICAL FIELD

The present application relates to a wheel machining device, specifically to an efficient wheel bolt pressing device.

BACKGROUND ART

In the machining industry of aluminum alloy wheels, forged wheels have the advantages of light weight, high strength, strong heat dissipation and the like, and forged wheels are thus increasingly widely applied. Sometimes, according to the requirements of customers, wheels need to be divided into inner bodies and outer bodies, and the inner bodies are connected with the outer bodies into a whole in an interference fit manner by special bolts.

SUMMARY OF THE INVENTION

The object of the present application is to provide a wheel bolt pressing device.

In order to fulfill the above object, the present application adopts the following technical solution: A wheel bolt pressing device in the present application mainly includes a frame, a servo motor, a connecting shaft, a bottom plate, a mounting base, a cylinder, a support, a spring A, a pull pin, a limiting sleeve, a thrust bearing, a bracket, a bolt, a strong magnet, a bolt mounting rack, a large linear bearing, a guide shaft, a press-down cylinder, a cylinder flange, a balancing stand, a guard, rollers, a mounting shaft, a mounting rack, contacts, an elastic rubber band, a holder, pin rolls, a base, a copper sleeve, a radial bearing, a bearing end cover, a cylinder pull rod, a base plate, a cylinder, a linear bearing A, a positioning pin, a spring B, a linear bearing B and a floating shaft.

The bottom plate and the servo motor are mounted on the frame, the mounting base and the support are mounted on the bottom plate, the cylinder and the linear bearing A are mounted on the support, the pull pin penetrates through the spring A and the linear bearing A and is connected with the output shaft of the cylinder, and the thrust bearing and the radial bearing are mounted on the mounting base. The limiting sleeve is connected with the thrust bearing via the bracket, and the front conical surface—of the pull pin can be matched with the lateral limiting hole—of the limiting sleeve. The base plate is connected with the output shaft of the servo motor via the connecting shaft, the upper end face of the base plate is connected with the bracket, and the bearing end cover is fixed on the base plate and the bearing end cover is connected with the radial bearing. The servo motor can drive the bracket to rotate by a specified angle; the cylinder and the spring A can control extension and contraction of the pull pin; and when air is introduced into the cylinder, the front conical surface—of the pull pin can be matched with the lateral limiting hole—of the limiting sleeve, and the wheel can be fixed at a certain specific angle under the cooperation of the servo motor.

The linear bearing B is fixed on the bracket, and the floating shaft is mounted on the linear bearing B via the positioning pin and the spring B; the floating shaft passes through the spring B and the linear bearing B, the positioning pin is installed at the upper end of the floating shaft, and the side wall of the positioning pin is a positive cone structure; in the placing process of the wheel, the positive conical surface structure—of the positioning pin is inserted into a wheel bolt hole, and high-precision circumferential positioning of the wheel is guaranteed under the coaction of elasticity of the spring and self-weight of the wheel; the linear bearing B is mounted on the bracket, the floating shaft penetrates through the spring B and the linear bearing B, and the positioning pin is mounted at the front end of the floating shaft. The base and the copper sleeve are mounted on the base plate. The cylinder pull rod penetrates through the copper sleeve, and has two ends connected with the output shaft of the cylinder and the guard respectively. The mounting rack is fixed on the cylinder pull rod, the six rollers are uniformly mounted on the mounting rack via the six pin rolls, the six contacts are uniformly mounted on the base via the holder and the pin rolls, the elastic rubber band is mounted on the holder, The rollers and the holder is inclined into a bevel contact, the cylinder pull rod drives the rollers to move up and down under the coaction of hydraulic pressure and the elastic rubber band, meanwhile, the rollers roll on the slope of the holder, the holder drives the contacts to rotate around the pin rolls, and the contacts realize expansion and contraction functions, so that positioning and clamping functions for wheels having different central hole diameters are realized.

Before actual use, compressed air is introduced into the cylinder, the elasticity of the spring A is overcome, and the pull pin is in the state of contraction; and under the action of the elastic rubber band, the cylinder pull rod and the rollers are located at the highest positions, and the holder and the contacts are in the state of contraction. In actual use, when a wheel is put onto this device, the central hole and bolt hole of the wheel are respectively aligned with the guard, the lateral conical surface of the positioning pin is completely fitted with the bolt hole of the wheel under the action of gravity of the wheel, then the cylinder begins working, the cylinder pull rod drives the rollers to move down, the rollers roll on the top slope of the holder, the holder drives the contacts to rotate outwards around the pin rolls, finally, the contacts contact the central hole of the wheel, the cylinder overcomes the elasticity of the spring A, the front conical surface of the pull pin can completely contact the lateral limiting hole of the limiting sleeve, the positioning procedure of the wheel is completed, a bolt pressing procedure begins, then the cylinder stops working, the front conical surface—of the pull pin can be matched with the lateral limiting hole—of the limiting sleeve under the action of the spring A, and the position of the wheel is completely fixed. The press-down cylinder begins working and drives the bolt mounting rack and the bolt to move down vertically, and the bolt is finally pressed into the connecting hole of the wheel. The press-down cylinder controls the bolt mounting rack to ascend, a spare bolt is mounted onto the bolt mounting rack via the strong magnet, the cylinder drives the pull pin to contract, the servo motor drives the wheel to rotate a specific angle, the cylinder begins working, the front conical surface of the pull pin may completely contact the lateral limiting hole of the limiting sleeve, the bolt pressing procedure is repeated to complete the bolt pressing operation of the second hole, and the above operation is repeated, till bolts are pressed into all mounting holes of the wheel.

The present application, is use, may meet the requirement of a wheel for pressing bolts on line, is ideal in effect, high in efficiency, safe and reliable in work and high in automation degree, and is particularly suitable for mass production in production lines.

Figure 1:
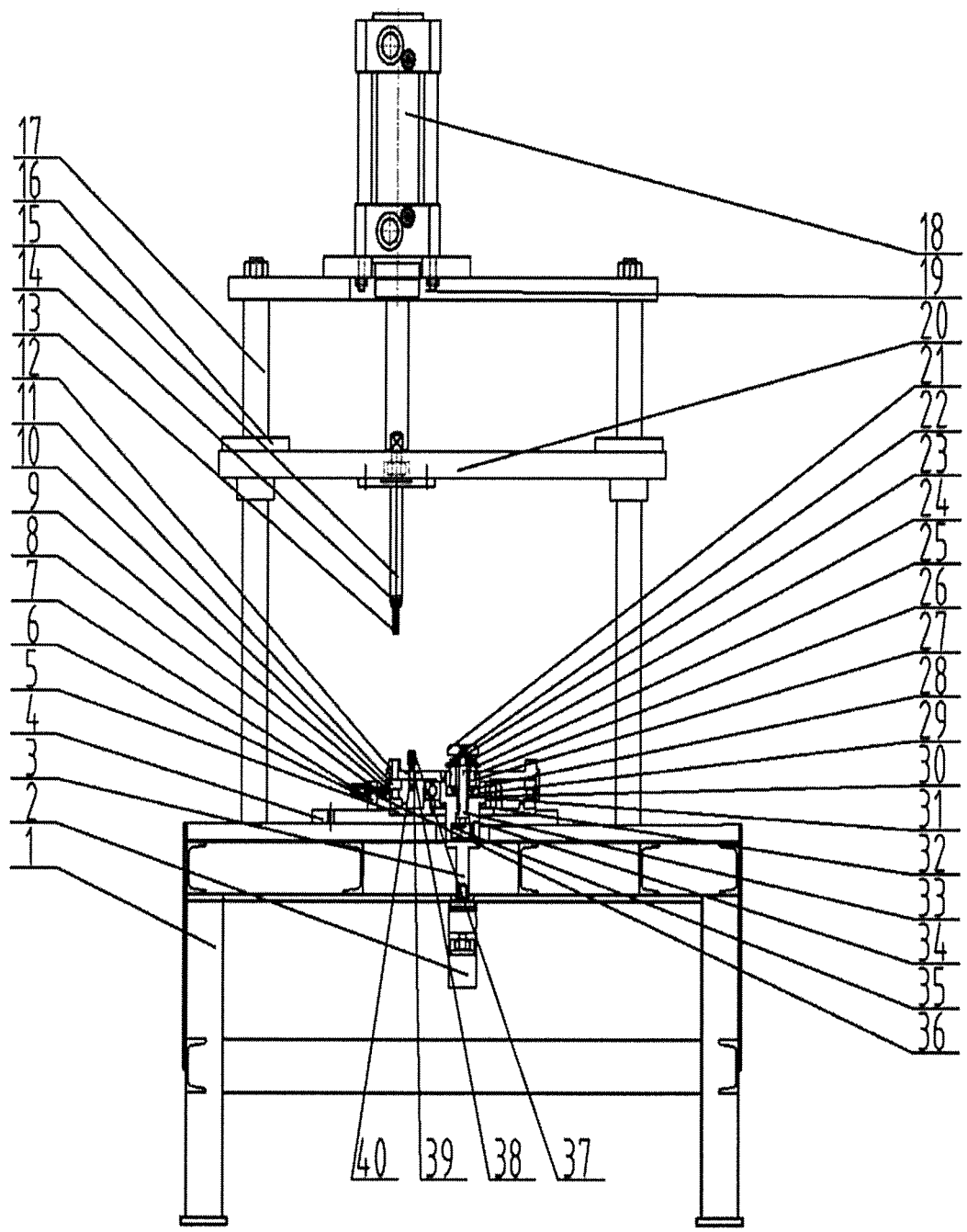
FIG. 1 is a structural schematic diagram of a wheel bolt pressing device of the present application.
Figure 2:
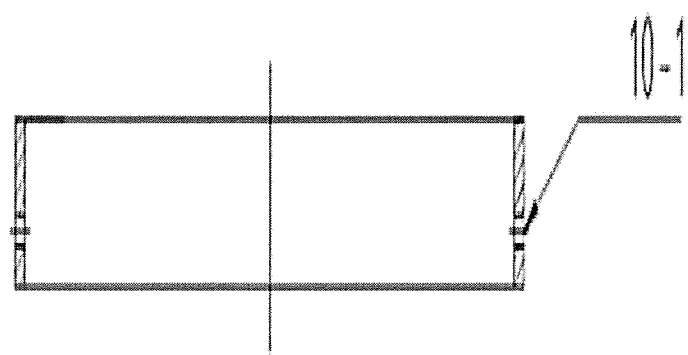
FIG. 2 is a structural schematic diagram of a sleeve in the wheel bolt pressing device of the present application.
Figure 3:
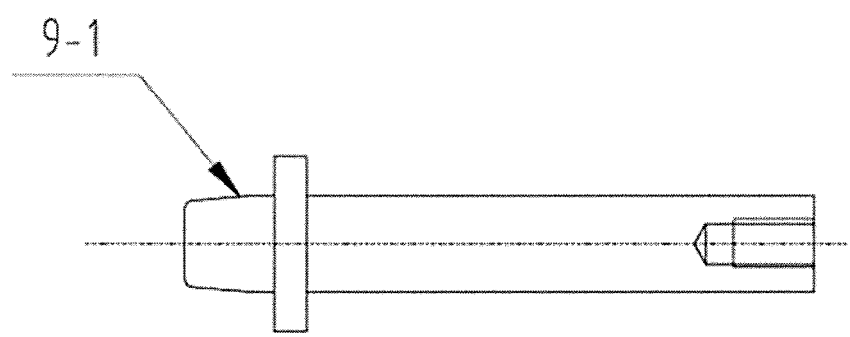
FIG. 3 is a structural schematic diagram of a pull pin in the wheel bolt pressing device of the present application.
Figure 4:
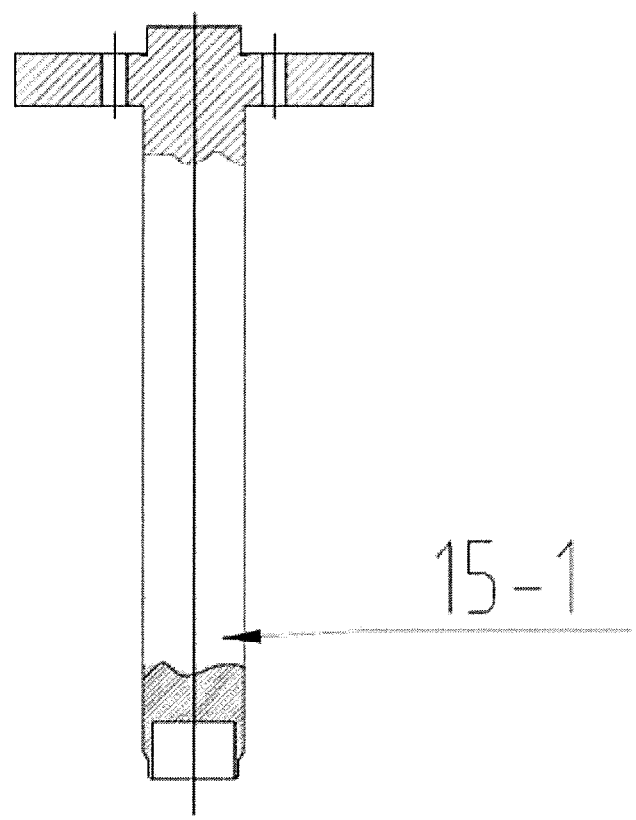
FIG. 4 is a structural schematic diagram of a bolt mounting rack in the wheel bolt pressing device of the present application.
Figure 5:
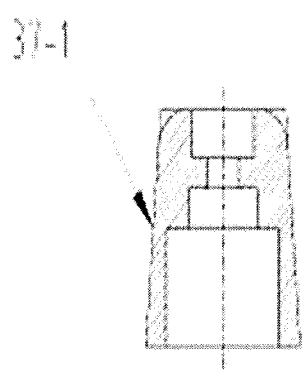
FIG. 5 is a structural schematic diagram of a positioning pin in the wheel bolt pressing device of the present application.

In figures: 1—frame, 2—servo motor, 3—connecting shaft, 4—bottom plate, 5—mounting base, 6—cylinder, 7—support, 8—spring A, 9—pull pin, 10—limiting sleeve, 11—thrust bearing, 12—bracket, 13—bolt, 14—strong magnet, 15—bolt mounting rack, 16—large linear bearing, 17—guide shaft, 18—press-down cylinder, 19—cylinder flange, 20—balancing stand, 21—guard, 22—roller, 23—mounting shaft, 24—mounting rack, 25—contact, 26—elastic rubber band, 27—holder, 28—pin roll, 29—base, 30—copper sleeve, 31—radial bearing, 32—bearing end cover, 33—cylinder pull rod, 34—base plate, 35—cylinder, 36—linear bearing A, 37—positioning pin, 38—spring B, 39—linear bearing B, 40—floating shaft.

DETAILED DESCRIPTION OF THE INVENTION

Details and working conditions of a specific device provided by the present application will be described in detail below in combination with the accompanying drawings.

A wheel bolt pressing device in the present application mainly includes a frame 1, a servo motor 2, a connecting shaft 3, a bottom plate 4, a mounting base 5, a cylinder 6, a support 7, a spring A8, a pull pin 9, a limiting sleeve 10, a thrust bearing 11, a bracket 12, a bolt 13, a strong magnet 14, a bolt mounting rack 15, a large linear bearing 16, a guide shaft 17, a press-down cylinder 18, a cylinder flange 19, a balancing stand 20, a guard 21, rollers 22, a mounting shaft 23, a mounting rack 24, contacts 25, an elastic rubber band 26, a holder 27, pin rolls 28, a base 29, a copper sleeve 30, a radial bearing 31, a bearing end cover 32, a cylinder pull rod 33, a base plate 34, a cylinder 35, a linear bearing A36, a positioning pin 37, a spring B38, a linear bearing B39 and a floating shaft 40.

The bottom plate 4 and the servo motor 2 are mounted on the frame 1, the mounting base 5 and the support 7 are mounted on the bottom plate 4, the cylinder 6 and the linear bearing A36 are mounted on the support 7, the pull pin 9 penetrates through the spring A8 and the linear bearing A36 and is connected with the output shaft of the cylinder 6, and the thrust bearing 11 and the radial bearing 31 are mounted on the mounting base 5. The limiting sleeve 10 is connected with the thrust bearing 11 via the bracket 12, and the front conical surface 9-1 of the pull pin 9 can be matched with the lateral limiting hole 10-1 of the limiting sleeve 10. The base plate 34 is connected with the output shaft of the servo motor 2 via the connecting shaft 3, the upper end face of the base plate 34 is connected with the bracket 12, and the bearing end cover 32 is fixed on the base plate 34 and the bearing end cover 32 is connected with the radial bearing 31. The servo motor 2 can drive the bracket 12 to rotate by a specified angle; the cylinder 6 and the spring A8 can control extension and contraction of the pull pin 9; and when air is introduced into the cylinder 6, the front conical surface 9-1 of the pull pin 9 can be matched with the lateral limiting hole 10-1 of the limiting sleeve 10, and the wheel can be fixed at a certain specific angle under the cooperation of the servo motor 2.

The linear bearing B39 is fixed on the bracket 12, and the floating shaft 40 is mounted on the linear bearing B39 via the positioning pin 37 and the spring B38; in the placing process of the wheel, the positive conical surface structure 37-1 of the positioning pin 37 is inserted into a wheel bolt hole, and high-precision circumferential positioning of the wheel is guaranteed under the coaction of elasticity of the spring 38 and self-weight of the wheel; the linear bearing B39 is mounted on the bracket 12, the floating shaft 40 penetrates through the spring B38 and the linear bearing B39, and the positioning pin 37 is mounted at the front end of the floating shaft 40. The base 29 and the copper sleeve 30 are mounted on the base plate 34. The cylinder pull rod 33 penetrates through the copper sleeve 30, and has two ends connected with the output shaft of the cylinder 35 and the guard 21 respectively. The mounting rack 24 is fixed on the cylinder pull rod 33, the six rollers 22 are uniformly mounted on the mounting rack 24 via the six pin rolls 28, the six contacts 25 are uniformly mounted on the base 29 via the holder 27 and the pin rolls 28, the elastic rubber band 26 is mounted on the holder 27, The rollers 22 and the holder 27 is inclined into a bevel contact, the cylinder pull rod 33 drives the rollers 22 to move up and down under the coaction of hydraulic pressure and the elastic rubber band 26, meanwhile, the rollers 22 roll on the slope of the holder 27, the holder 27 drives the contacts 25 to rotate around the pin rolls 28, and the contacts 25 realize expansion and contraction functions, so that positioning and clamping functions for wheels having different central hole diameters are realized.

Before actual use, compressed air is introduced into the cylinder 6, the elasticity of the spring A8 is overcome, and the pull pin 9 is in the state of contraction; and under the action of the elastic rubber band 26, the cylinder pull rod 33 and the rollers 22 are located at the highest positions, and the holder 27 and the contacts 25 are in the state of contraction. In actual use, when a wheel is put onto this device, the central hole and bolt hole of the wheel are respectively aligned with the guard 21 and the positioning pin 37, the lateral conical surface 37-1 of the positioning pin 37 is completely fitted with the bolt hole of the wheel under the action of gravity of the wheel, then the cylinder 35 begins working, the cylinder pull rod 33 drives the rollers 22 to move down, the rollers 22 roll on the top slope of the holder 27, the holder 27 drives the contacts 25 to rotate outwards around the pin rolls 28, finally, the contacts 25 contact the central hole of the wheel, the cylinder 6 overcomes the elasticity of the spring A8, the front conical surface 9-1 of the pull pin 9 can completely contact the lateral limiting hole 10-1 of the limiting sleeve 10, the positioning procedure of the wheel is completed, a bolt pressing procedure begins, then the cylinder 6 stops working, the front conical surface 9-1 of the pull pin 9 can be matched with the lateral limiting hole 10-1 of the limiting sleeve 10 under the action of the spring A8, and the position of the wheel is completely fixed. The press-down cylinder 18 begins working and drives the bolt mounting rack 15 and the bolt 13 to move down vertically, and the bolt 13 is finally pressed into the connecting hole of the wheel. The press-down cylinder 18 controls the bolt mounting rack 15 to ascend, a spare bolt 13 is mounted onto the bolt mounting rack 15 via the strong magnet 14, the cylinder 6 drives the pull pin 9 to contract, the servo motor 2 drives the wheel to rotate a specific angle, the cylinder 6 begins working, the front conical surface 9-1 of the pull pin 9 can completely contact the lateral limiting hole 10-1 of the limiting sleeve 10, the bolt pressing procedure is repeated to complete the bolt pressing operation of the second hole, and the above operation is repeated, till bolts are pressed into all mounting holes of the wheel.

The foregoing descriptions of specific exemplary embodiments of the present application have been presented for purposes of illustration and description. They are not intended to be exhaustive or to limit the to the precise forms disclosed, and obviously many modifications and variations are possible in light of the above teachings. The exemplary embodiments were chosen and described in order to explain certain principles of the and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A wheel bolt pressing device, comprising a frame, a servo motor, a connecting shaft, a bottom plate, a mounting base, a cylinder, a support, a spring A, a pull pin, a limiting sleeve, a thrust bearing, a bracket, a bolt, a magnet, a bolt mounting rack, a large linear bearing, a guide shaft, a press-down cylinder, a cylinder flange, a balancing stand, a guard, rollers, a mounting shaft, a mounting rack, contacts, an elastic rubber band, a holder, pin rolls, a base, a copper sleeve, a radial bearing, a bearing end cover, a cylinder pull rod, a base plate, a second cylinder, a linear bearing A, a positioning pin, a spring B, a linear bearing B and a floating shaft, wherein the bottom plate and the servo motor are mounted on the frame, the mounting base and the support are mounted on the bottom plate, the cylinder and the linear bearing A are mounted on the support, the pull pin penetrates through the spring A and the linear bearing A and is connected with an output shaft of the cylinder, the thrust bearing and the radial bearing are mounted on the mounting base; the limiting sleeve is connected with the thrust bearing via the bracket, the front conical surface of the pull pins are configured to be matched with the lateral limiting hole of the limiting sleeve; the base plate is connected with an output shaft of the servo motor via the connecting shaft, the upper end face of the base plate is connected with the bracket, and the bearing end cover is fixed on the base plate and the bearing end cover is connected with the radial bearing; the servo motor is configured to drive the bracket to rotate a specified angle; the cylinder and the spring A is configured to control extension and contraction of the pull pin; when air is introduced into the cylinder, the front conical surface of the pull pin is configured to be matched with a lateral limiting hole of the limiting sleeve, and a wheel is configured to be fixed at a certain specific angle under the cooperation of the servo motor;

the linear bearing B is fixed on the bracket, the floating shaft is mounted on the linear bearing B via the positioning pin and the spring B; the base and the copper sleeve are mounted on the base plate; the cylinder pull rod penetrates through the copper sleeve, and has two ends connected with the output shaft of the cylinder and the guard respectively; the mounting rack is fixed on the cylinder pull rod, six rollers of the rollers are uniformly mounted on the mounting rack via six pin rolls of the pin rolls, six contacts of the contacts are uniformly mounted on the base via the holder and the pin rolls, the elastic rubber band is mounted on the holder, the rollers are in slope contact with the holder, the cylinder pull rod drives the rollers to move up and down under the coaction of hydraulic pressure and the elastic rubber band, while the rollers roll on the slope of the holder, the holder drives the contacts to rotate around the pin rolls, and the contacts have expansion and contraction functions, make wheels having different central hole diameters be positioned and clamped.

2. The wheel bolt pressing device of claim 1, wherein the floating shaft penetrates through the spring B and the linear bearing B, the positioning pin is mounted at the upper end of the floating shaft, and the side wall of the positioning pin is of a positive conical surface structure; in placing process of the wheel, the positive conical surface structure of the positioning pin is inserted into a wheel bolt hole, and high-precision circumferential positioning of the wheel is guaranteed under the coaction of elasticity of the spring and self-weight of the wheel.

\* \* \* \* \*